United States Patent
Wang et al.

(10) Patent No.: US 7,487,341 B2
(45) Date of Patent: Feb. 3, 2009

(54) HANDLING ADDRESS TRANSLATIONS AND EXCEPTIONS OF A HETEROGENEOUS RESOURCE OF A PROCESSOR USING ANOTHER PROCESSOR RESOURCE

(75) Inventors: Hong Wang, Fremont, CA (US); Hong Jiang, El Dorado Hills, CA (US); John Shen, San Jose, CA (US); Porus S. Khajotia, Rancho Cordova, CA (US); Ming W. Choy, Antelope, CA (US); Narayan Biswal, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 11/477,643

(22) Filed: Jun. 29, 2006

(65) Prior Publication Data

US 2008/0005546 A1 Jan. 3, 2008

(51) Int. Cl.
*G06F 9/00* (2006.01)
*G06F 12/10* (2006.01)

(52) U.S. Cl. .................................. 712/244; 711/202
(58) Field of Classification Search ............ 712/40, 712/227, 244; 719/318; 711/6, 202, 206, 711/203, 207
See application file for complete search history.

(56) References Cited

U.S. PATENT DOCUMENTS

| | | | |
|---|---|---|---|
| 5,247,629 A * | 9/1993 | Casamatta et al. | 711/206 |
| 5,301,287 A * | 4/1994 | Herrell et al. | 711/202 |
| 5,953,741 A * | 9/1999 | Evoy et al. | 711/132 |
| 6,252,612 B1 | 6/2001 | Jeddeloh | |
| 6,282,601 B1 * | 8/2001 | Goodman et al. | 710/260 |
| 6,317,706 B1 * | 11/2001 | Saib | 703/27 |
| 6,408,386 B1 | 6/2002 | Hammond et al. | |
| 6,418,523 B2 | 7/2002 | Porterfield | |
| 6,651,163 B1 * | 11/2003 | Kranich et al. | 712/244 |
| 6,925,547 B2 * | 8/2005 | Scott et al. | 711/207 |
| 7,065,633 B1 | 6/2006 | Yates, Jr. et al. | |
| 2003/0101334 A1 * | 5/2003 | Desoli | 712/227 |
| 2007/0005927 A1 * | 1/2007 | Khosravi et al. | 711/173 |

OTHER PUBLICATIONS

U.S. Appl. No. 11/027,445, filed Dec. 3, 2004, entitled "Mechanism to Schedule Threads on OS-Sequestered Sequencers without Operating System Intervention" by Richard A. Hankins et al.
U.S. Appl. No. 11/100,032, filed Apr. 5, 2005, entitled "Sequencer Address Management" by Hong Wang et al.
U.S. Appl. No. 11/173,326, filed Jun. 30, 2005, entitled "A Mechanism for Instruction Set Based Thread Execution on a Plurality of Instruction Sequencers" by Hong Wang et al.
U.S. Appl. No. 11/321,779, filed Dec. 29, 2005, entitled "Instruction Set Architecture-Based Inter-Sequencer Communications With A Heterogeneous Resource" by Hong Wang et al.

* cited by examiner

*Primary Examiner*—David J Huisman
(74) *Attorney, Agent, or Firm*—Trop, Pruner & Hu, P.C.

(57) ABSTRACT

In one embodiment, the present invention includes a method for communicating a request for handling of a fault or exception occurring in an accelerator to a first instruction sequencer coupled thereto. The accelerator may be a heterogeneous resource with respect to the first instruction sequencer, e.g., of a different instruction set architecture. Responsive to the request, the fault or exception may be handled in the first instruction sequencer. Other embodiments are described and claimed.

22 Claims, 6 Drawing Sheets

HANDLING ADDRESS TRANSLATIONS AND EXCEPTIONS OF A HETEROGENEOUS RESOURCE OF A PROCESSOR USING ANOTHER PROCESSOR RESOURCE

BACKGROUND

Embodiments of the present invention relate to a processor-based system, and more particularly to a system including multiple sequencers of different instruction set architectures.

Computer systems include various components to process and communicate data. Typical systems include one or multiple processors, each of which may include multiple cores, along with associated memories, input/output (I/O) devices and other such components. To improve computation efficiencies, computation accelerators, special-purpose I/O devices and other such specialized units may be provided via one or more specialized components, referred to generically herein as helper units. However, inefficiencies may occur in using such helper units, as in a typical computing environment that implements a general-purpose processor and an industry-standard operating system (OS) environment, a software stack can impede efficient usage. That is, in a typical OS environment, system software is isolated from application software via different privilege levels, and operations in each of these different privilege levels are subject to OS context save and restore operations, among other limitations. Further, helper units typically lack the ability to handle processing of exceptions and faults that allow robust handling of certain events during execution.

Classic examples of a computation accelerator are coprocessors such as math coprocessors like so-called x87 floating point coprocessors for early Intel® Architecture (IA)-32 processors. Typically, such coprocessors are coupled to a main processor (e.g., a central processing unit (CPU)) via a coprocessor interface, which is of a common instruction set architecture (ISA) as the main processor. More recently, separate resources having different instruction set architectures (ISAs) have appeared in systems.

Where multiple resources of different ISAs are present in a system that runs a single image OS (e.g., industry-standard OS) written for a single ISA, typically limited or no support for handling exceptions or faults incurred during code execution on the resource(s) of a heterogeneous ISA is afforded. Even if such handling were present, potentially disparate architectural mechanisms of the different ISAs would require major rewriting of the OS. As a result, heterogeneous resources generally do not provide support for exception and fault handling, which diminishes their suitability for various tasks.

DETAILED DESCRIPTION

In various embodiments, mechanisms are provided to enable instruction set architecture (ISA)-based exception handling and address translation mechanisms. As used herein, a "sequencer" is a distinct thread execution resource and may be any physical or logical unit capable of executing a thread. A sequencer may be a logical thread unit or a physical thread unit, and may include next instruction pointer logic to determine the next instruction to be executed for the given thread.

In many implementations, a system may include a first sequencer of a first ISA and a second computation resource (which may be a sequencer or non-sequencer) of a heterogeneous nature. That is, the second resource may be a sequencer of a different ISA or may be a non-sequencer resource, such as a fixed function unit (FFU), an application specific integrated circuit (ASIC) or other pre-programmed logic. In various embodiments, an intermediary or interface, referred to herein as an "exo-skeleton," may provide for communication between such heterogeneous resources. In different embodiments an exo-skeleton may take various forms, including software, hardware, and/or firmware. In some embodiments, the exo-skeleton may be implemented in a finite state machine (FSM) tightly coupled to the heterogeneous resource. Of course, other implementations are possible.

Figure 1:
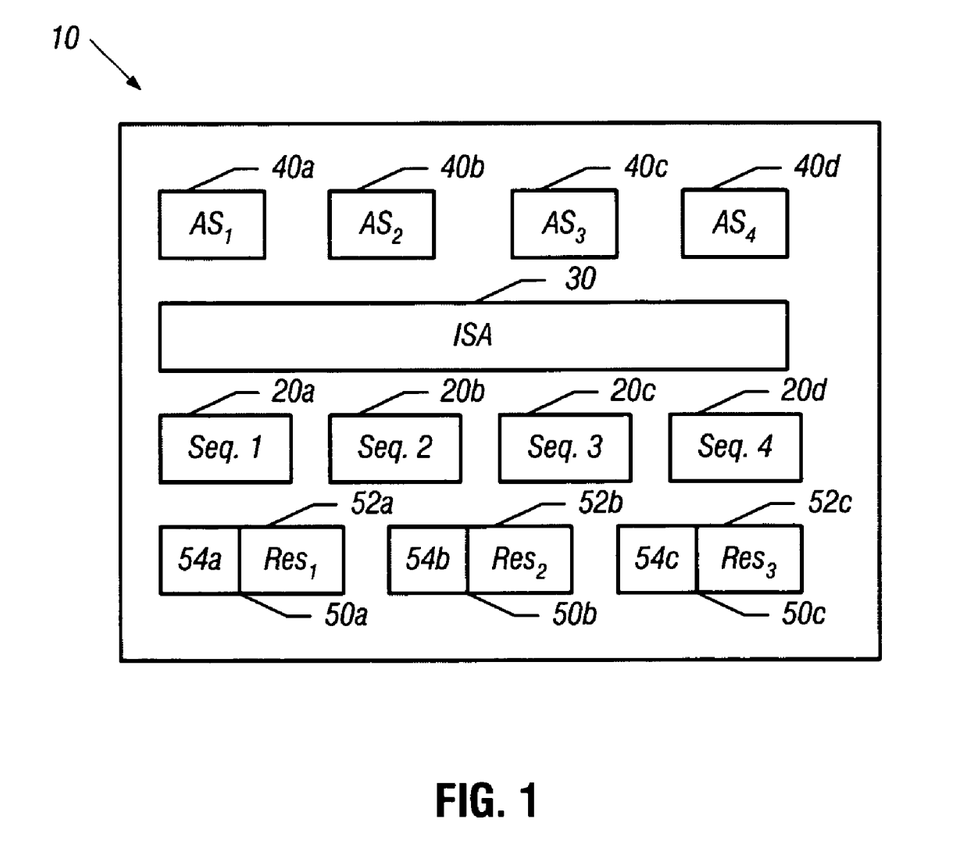
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 includes a variety of different resources. In different implementations, processor 10 may be a single core processor or a multi-core processor. Such a processor may be implemented in different types of systems, including a chip multiprocessor (CMP) system, a simultaneous multithreading (SMT) system or a switch-on-event multithreading (SoeMT) system, among other such systems.

As shown in FIG. 1, processor 10 includes a plurality of sequencers 20a, 20b, 20c, and 20d (i.e., sequencers 1-4, and generically sequencers 20). While shown with four such sequencers in the embodiment of FIG. 1, it is to be understood that the scope of the present invention is not so limited. As shown in FIG. 1, sequencers 20 in processor 10 implement an ISA 30, which in one embodiment may be an Intel® Architecture (IA-32) instruction set architecture and/or its 64-bit extension (also called Intel® extended memory 64-bit technology (EM64T)). Processor 10 further includes other resources, including a first resource (i.e., resource 1) 50a, a second resource (i.e., resource 2) 50b, and a third resource 50c (i.e., resource 3) (and generically resources 50). These resources may be heterogeneous resources that do not implement ISA 30 of processor 10. While shown in the embodiment of FIG. 1 as including three such resources, more or fewer are possible in different embodiments.

Each resource 50 includes a sequencer (which may implement a different ISA from ISA 30), non-sequencer processing engine, or other specialized functional logic, referred to generically herein as an accelerator. In different embodiments, different types of resources may be implemented as accelerators, including a graphics processing unit (GPU) (typically a sequencer), a cryptographic unit (typically a non-sequencer), a physics processing unit (PPU) (typically a non-sequencer), a fixed function unit (FFU) (typically a non-sequencer) and the like. As shown in FIG. 1, each resource 50 may include an accelerator 52 (generically) and more specifically, accelerators 52*a*, 52*b*, and 52*c*, each associated with one of resources 50*a*-50*c*. Accelerators 52 are also referred to herein as helper units. Because resources 50*a*-50*c* may be of another ISA or may even be a non-sequencer and as such can be heterogeneous with respect to sequencers 20, an interface may be used to provide the ability to communicate with such resources. Specifically as shown in FIG. 1, exo-skeletons 54*a*, 54*b*, and 54*c* (generically exo-skeleton 54) may be associated with each of resources 50. Each resource 50 may thus be referred to as an "exo-sequencer," indicating the tight coupling between exo-skeleton 54 and its associated accelerator 52. In this manner, these heterogeneous resources may be integrated with homogeneous sequencer resources in a unified ISA framework that supports inter-sequencer communication.

However in other embodiments, resources 50 may be homogeneous sequencer resources with respect to sequencers 20 and can be symmetric cores such that they include the same or similar architecture as sequencers 20. In such manner, concurrent fibers may be implemented and legacy OS scalability can be enhanced. Still further, in other implementations resources 50 may be asymmetric cores. In other words, these resources may be of the same ISA as sequencers 20, but of a different micro-architecture. Such embodiments may help manage the asymmetry and provide compatibility with a legacy OS.

For embodiments that implement heterogeneous resources, an exo-skeleton may provide the illusion that these heterogeneous resources are of a common ISA to achieve minimal compliance for inter-sequencer communications. Thus in various embodiments, a heterogeneous resource can function as a user-level functional unit resource (rather than a system-level device).

While shown with the particular resources in the embodiment of FIG. 1, it is to be understood that processor 10 may be a single physical processor that can support multiple hardware thread contexts (without loss of clarity, also called "thread context", note this is not the same as software thread context), each including a set of the architectural state. In some embodiments, certain resources may be visible to these thread contexts, while other resources are invisible. Thus as shown in FIG. 1, each of sequencers 20 may correspond to a thread context. When at least some of these thread contexts (e.g., m out of n, m≦n) are made visible to the operating system, these thread contexts are sometimes referred to as logical processors or OS-managed sequencers (OMS's). Each thread context maintains a set of the architecture state AS1-ASn, respectively. The architecture state includes, for example, data registers, segment registers, control registers, debug registers, and most of the model specific registers. The thread contexts may share most micro-architectural resources of the physical processor, such as caches, execution units, branch predictors, control logic and buses. Although such features may be shared, each thread context of processor 10 can independently generate a next instruction address (and perform, for instance, a fetch from an instruction cache, an execution instruction cache, or trace cache). Each of sequencers 20 corresponding to a thread context is associated with a corresponding architecture state 40 (generically). More specifically, architecture state (AS1) 40*a* may be associated with sequencer 20*a*, AS2 40*b* may be associated with sequencer 20*b*, AS3 40*c* may be associated with sequencer 20*c*, and AS4 40*d* may be associated with sequencer 20*d*, for example.

Using processor 10 or a similar such processor, ISA-based inter-sequencer communications may occur without involving an OS. For example, in a shared-memory multiprocessing paradigm an application programmer may split a software program (i.e., an application or process) into multiple tasks to be run concurrently in order to express parallelism. All threads of the same software program ("process") share a common logical view of memory address space. However, an OS thread may be associated with multiple user-level threads that may not be created, scheduled, or otherwise managed by the operating system. Such user-level threads may be referred to as "shreds," in order to distinguish them from OS threads. These shreds may not be visible to the OS scheduler and therefore the OS does not manage when or how the associated OS thread schedules a shred to run on an assigned logical sequencer address. The OS thread is itself usually responsible to schedule when and how to run one of its shreds.

Architectural support for ISA-based inter-sequencer communications may include extensions to an ISA such that one or more instructions are provided to allow a user to directly manipulate control and state transfers between sequencers. Such instructions may include instructions that either provide for a first sequencer to signal another (i.e., a second) sequencer (one instruction is referred to herein as a shred transfer or "SXFR" instruction, which may send egress control information, called an egress scenario, and may also carry data payload) or provide for setting up a second sequencer to monitor for such a signal (referred to herein as a shred monitor or "SEMONITOR" instruction) and perform control transfer to a handler upon receiving the signal (called an ingress scenario) asynchronously.

In embodiments in which accelerator 52 is of a heterogeneous ISA or is a non-sequencer, the corresponding exo-skeleton 54 which may be a finite state machine (FSM) or virtualization layer, may be implemented (in hardware, firmware or even in software, depending on specific embodiments) so that accelerator 52 can participate in inter-sequencer communications. Such ISA-based inter-sequencer communications provide a signaling protocol in an ingress direction into accelerator 52 so that it may monitor and respond to ingress scenarios sent by SXFR from another sequencer or exo-sequencer, including GET and/or SET instructions for the exo-sequencer's architectural state. Furthermore, the signaling protocols include egress communications from accelerator 52 to signal a corresponding sequencer 20 with an egress scenario including an indication for exception handling such as a proxy execution request for such events as page faults.

To reduce overhead, ISA-based inter-sequencer communication between sequencer 20 and accelerator 52 via sequencer-aware instructions may not require involvement of an OS. In this way, a device driver stack of the OS can be avoided and instead direct communications between sequencer 20 and accelerator 52 can be effected.

In various embodiments, address translation re-mapping (ATR) and collaborative exception handling (CEH) may be implemented in a system such as a CMP system integrated with application-managed exo-sequencers of heterogeneous ISAs on which program execution may incur page faults or exceptions. Using embodiments of the present invention, page faults and exceptions incurred on the application managed exo-sequencers can be gracefully handled by the OMS and the OS running on the OMS. For example, to ease programming of a CMP with exo-sequencers of different ISAs (and in particular in a single-image OS environment), virtual shared memory may be supported between the OMS and the exo-sequencers, even when the exo-sequencers might have different address translation hardware mechanisms from that of the OMS. When code running on an exo-sequencer incurs an architectural or micro-architectural fault condition with respect to a virtual to physical address translation, embodiments may handle the faulting condition (architectural or micro-architectural) by the OS running on the OMS.

Similarly, operations may be performed on different data types in the different sequencers. As an example, the various sequencers may execute in a parallel fashion, for example, in a single instruction multiple data (SIMD) or a multiple instruction multiple data (MIMD) fashion so that each resource may be used concurrently to improve performance. When exceptions occur on the exo-sequencer, they may be passed off to the OMS. However, the different data types can make this difficult. Thus in some embodiments, an exo-sequencer may include hardware to assist in transforming native data types of the exo-sequencer to format more suitable to OMS. For example, an exo-skeleton may be coupled with the exo-sequencer to handle such data transformations and enable inter-sequencer communications. As one example, SIMD data types of an exo-sequencer can be transformed into scalar values for exception handling on the OMS.

Figure 2:
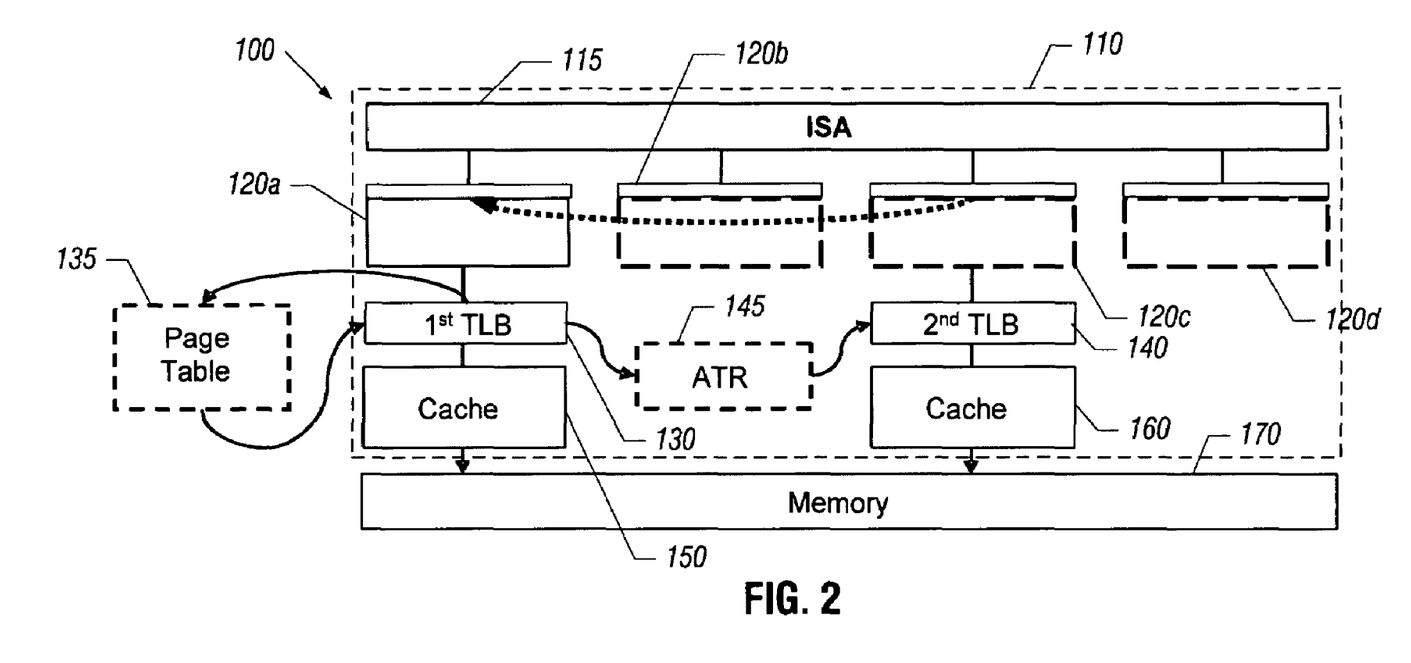
FIG. 2 is a block diagram of a portion of a system in accordance with one embodiment of the present invention.

Referring now to FIG. 2, shown is a block diagram of a portion of a system in accordance with one embodiment of the present invention. As shown in FIG. 2, system 100 includes a processor 110 which may be a CMP having a plurality of sequencers. Specifically, the embodiment of FIG. 2 includes four sequencers $120_a$-$120_d$ (generically sequencer 120). While shown with four such sequencers for purposes of illustration, it is to be understood that the scope of the present invention is not limited in this regard. In many implementations, one or more of sequencers $120_a$-$120_d$ may be of a heterogeneous ISA or another heterogeneous resource with regard to a native ISA 115 of system 100. For purposes of explanation, first sequencer $120_a$ may be a sequencer of the native ISA. For example, in one embodiment first sequencer $120_a$ may be an IA-32 CPU, although the scope of the present invention is not limited in this regard. Accordingly, first sequencer $120_a$ operates as an OMS. One or more other sequencers 120 may also be IA-32-based sequencers implementing native ISA operation. However, at least one of sequencers 120, e.g., third sequencer $120_c$ may be a heterogeneous sequencer. For purposes of illustration, third sequencer $120_c$ may be a heterogeneous resource, e.g., a graphics processing unit (GPU) or another such heterogeneous engine of a different (non-native) ISA. As such, third sequencer $120_c$ operates as an application-managed exo-sequencer. As an example, first sequencer $120_a$ may run an IA-32-based single-image OS like Windows™ or Linux™, and through inter-sequencer signaling mechanisms inter-operate with third sequencer $120_c$, e.g., via SXFR based inter-sequencer signaling mechanisms. To enable ISA-based inter-sequencer communications third sequencer $120_c$ may include an exo-skeleton. Together, the exo-skeleton and its underlying third sequencer $120_c$ together are also referred to herein as an exo-sequencer.

In various embodiments, address translation re-mapping (ATR) may be implemented to support shared virtual memory between multiple sequencers via proxy execution of page fault handling. More specifically, inter-sequencer communication mechanisms between third sequencer $120_c$ and first sequencer $120_a$ may be used to perform such page fault handling in first sequencer $120_a$ in a proxy execution mode. Accordingly, when code running on third sequencer $120_c$ incurs an architectural fault (e.g., page fault) or micro-architectural fault condition (e.g., TLB miss), e.g., with respect to virtual to physical address translations, the faulting condition on third sequencer $120_c$ may be handled via address translation mechanisms on first sequencer $120_a$ as implemented by the native OS. Thus as shown in FIG. 2, on such a fault condition, third sequencer $120_c$ passes a message to first sequencer $120_a$, e.g., via a SXFR message. In turn, first sequencer $120_a$ may perform a fault handling procedure, which may be hardware, software or firmware-based or a combination thereof, to determine if the faulting address is present in a first translation lookaside buffer (TLB) 130 coupled to processor 110. If not, a page walk mechanism is initiated to cause the requested page to be obtained from a page table 135 and be stored in first TLB 130. Note that the page walk mechanism from first TLB 130 to page table 135 is implemented according to an OS-enabled page walking mechanism that is supported in hardware including conventional processor TLB design and in OS software including the virtual memory system. Consequently, this virtual-to-physical address translation (e.g., page table entry) in the format of sequencer $120_a$ is re-mapped according to an address translation re-mapping mechanism (re-mapper) 145 to a format that is native to third sequencer $120_c$. This remapped page translation can then be provided to second TLB 140 coupled to third sequencer $120_c$. In turn, third exo-sequencer $120_c$ now can access the same physical page provided by first sequencer $120_a$. In effect, both sequencers $120_a$ and $120_c$ can share the common virtual address space despite the heterogeneity between the two sequencers. Re-mapper 145 may be implemented in hardware, software or firmware, or a combination thereof. Further, as represented by the dashed box in FIG. 2, the functionality of re-mapper 145 may be implemented as part of first sequencer $120_a$ or third sequencer $120_c$, for example. In this way, the faulting condition is handled in a native mode, and the requested information is provided to third sequencer $120_c$, such that a faulting condition of a heterogeneous resource, e.g., third sequencer $120_c$ may be gracefully handled by an OS running on an OMS, e.g., first sequencer 120a.

Note further in the embodiment FIG. 2, additional levels of a memory hierarchy are present. Specifically, as shown in FIG. 2, a cache memory 150 is coupled to first TLB 130, and a corresponding cache memory 160 is coupled to second TLB 140. In turn, caches 150 and 160 are coupled to a memory 170, which in one embodiment may be a dynamic random access memory (DRAM). While shown with this particular implementation in the embodiment FIG. 2, it is to be understood that the scope of the present invention is not limited in this regard.

Figure 3:
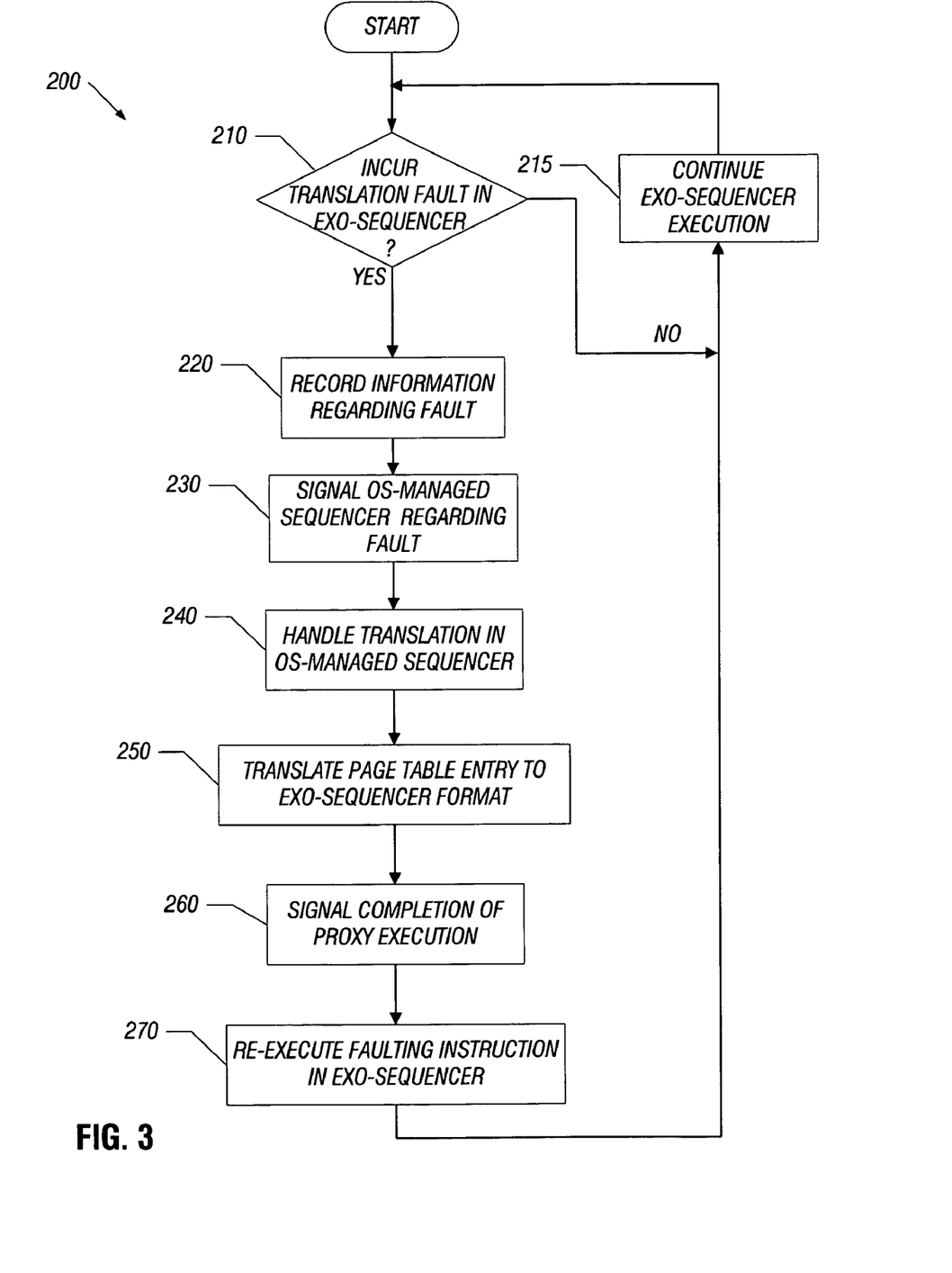
FIG. 3 is a flow diagram of a method of handling a fault condition in a heterogeneous resource in accordance with one embodiment of the present invention.

In various implementations, different manners of performing fault handling may be realized. Referring now to FIG. 3, shown is a flow diagram of a method of handling a fault condition in a heterogeneous resource in accordance with one embodiment of the present invention. As shown in FIG. 3, method 200 may begin by determining whether a translation fault was incurred in an exo-sequencer (diamond 210). This translation fault may correspond to an architectural or micro-architectural fault condition with respect to a virtual-to-physical address translation. Upon incurring such a fault, the exo-sequencer may suspend its code execution and record information regarding the fault (block 220). More specifically, the exo-sequencer may record the faulting instruction condition, including the faulting virtual address or addresses. Such faulting addresses may correspond to one or more virtual addresses that are unavailable in a translation buffer such as a TLB of the exo-sequencer. If no such fault is incurred, control passes to block 215, where continued execution of instructions in the exo-sequencer may occur, with control looping back to diamond 210.

Still referring to FIG. 3, from block 220 control passes to block 230. There, an OMS may be signaled regarding the fault (block 230). More specifically, the exo-sequencer may signal the OMS to notify it regarding the fault. In one embodiment, a proxy execution request signal may be sent. Such a signal may be sent with message information regarding the fault. This information may include an identification of the type of fault and the faulting address or addresses. In some embodiments, the information regarding the fault in the message may provide a pointer to a storage location accessible to both the exo-sequencer and the OMS such as register or physical memory, where descriptors of details of the fault are stored. This information can then be retrieved by the OMS during its proxy execution, and conversely, the result of proxy execution can be stored there for the exo-sequencer to retrieve later. In some embodiments, a native address-bearing data type for the exo-sequencer for the faulting instruction may have multiple addresses that incur faults. For example, a GPU exo-sequencer might incur a translation fault on a native data type of a vector or array, while the OMS (like an IA-32 processor) usually only supports scalar data types, such as word, byte etc., for memory access. Accordingly, in such embodiments the exo-sequencer may be responsible for signaling to the OMS the manner in which fault handling should occur, e.g., one address at a time or bundling of multiple addresses in an aggregate proxy execution request.

In response to the proxy execution request signal, the OMS may handle the translation fault (block 240). More specifically, a native translation fault handling mechanism of the OMS may be activated to perform the handling. The handler may perform an access to a faulting address to ensure the fault is resolved at the OMS. If the desired memory region corresponding to the faulting address (e.g., a page) is not resident in a translation buffer (such as a TLB) associated with the OMS, the handler may incur a TLB miss fault when executing the access. In turn, this may activate the OMS's page walker to obtain the demanded page entry from memory and update the TLB accordingly. Should the access instead incur a page fault, the OS paging mechanism will be activated on the OMS, which will bring the demanded page from external storage like disk into main memory and update the page tables accordingly, and the corresponding page entry will be filled into the OMS's TLB. In either case, the page table entry corresponding to the demanded page may then be translated to the format of the exo-sequencer (block 250). Accordingly, an address translation re-mapping procedure may be performed. That is, due to the format difference in paging systems between the OMS and the exo-sequencer, the page table entry format for the OMS may be "transformed" or "transcoded" into the format of the exo-sequencer. In various embodiments, this process may be executed by the OMS or the exo-sequencer or an intermediary.

Still referring to FIG. 3, when the OMS completes proxy execution on accessing the missing page, it may signal proxy execution completion to the exo-sequencer (block 260). Accordingly, execution may be resumed on the exo-sequencer. Consequently, the exo-sequencer may resume suspended execution and re-execute the faulting instruction (block 270). As shown in FIG. 3, control passes from block 270 to block 215 for continued exo-sequencer execution. Via the page update performed by the OMS, the previously faulting instruction should not incur a fault and the exo-sequencer can make forward progress. Otherwise, at diamond 210 a determination of another incurred translation fault may be effected and further execution of method 200 may be performed. While described with this particular implementation in the embodiment of FIG. 3, it is to be understood that the scope of the present invention is not limited in this regard.

Using method 200 or a similar such method to handle translation faults in an OMS of a system, page faults or TLB faults on an exo-sequencer can be handled by a general-purpose OMS in a proxy execution mode, despite differences in translation mechanisms. Accordingly, there is no need for support in the exo-sequencer for emulating or otherwise performing the exact address translations of the native ISA of the OMS. In this way, the exo-sequencer need not be extended with the OMS's native page walk mechanism. For example, with regard to an IA-32 OMS, a GPU exo-sequencer with ATR support does not need to implement the IA-32's paging mechanism support directly in its hardware. Instead, it only needs to detect a page fault or TLB miss on its own paging support mechanism, and then activate the ATR mechanism and resort to the OMS's proxy execution to use the OS on the OMS to perform address translation on behalf of the exo-sequencer. After the proxy execution, the page entry can be remapped to the GPU's format and installed in the GPU's TLB. Thus, when remapped translations (e.g., page table entry) are provided to the exo-sequencer from the OMS, the exo-sequencer's native page walk mechanism (e.g., of a GPU page entry format of a Microsoft® Windows Advanced Scheduler™ configuration) may be implemented so that the translation of virtual address-to-physical address corresponds to the proper location in a shared virtual memory space or address space. As result, both OMS and exo-sequencer can implement a shared virtual memory, despite the difference in their hardware mechanisms for address translation support.

Figure 4:
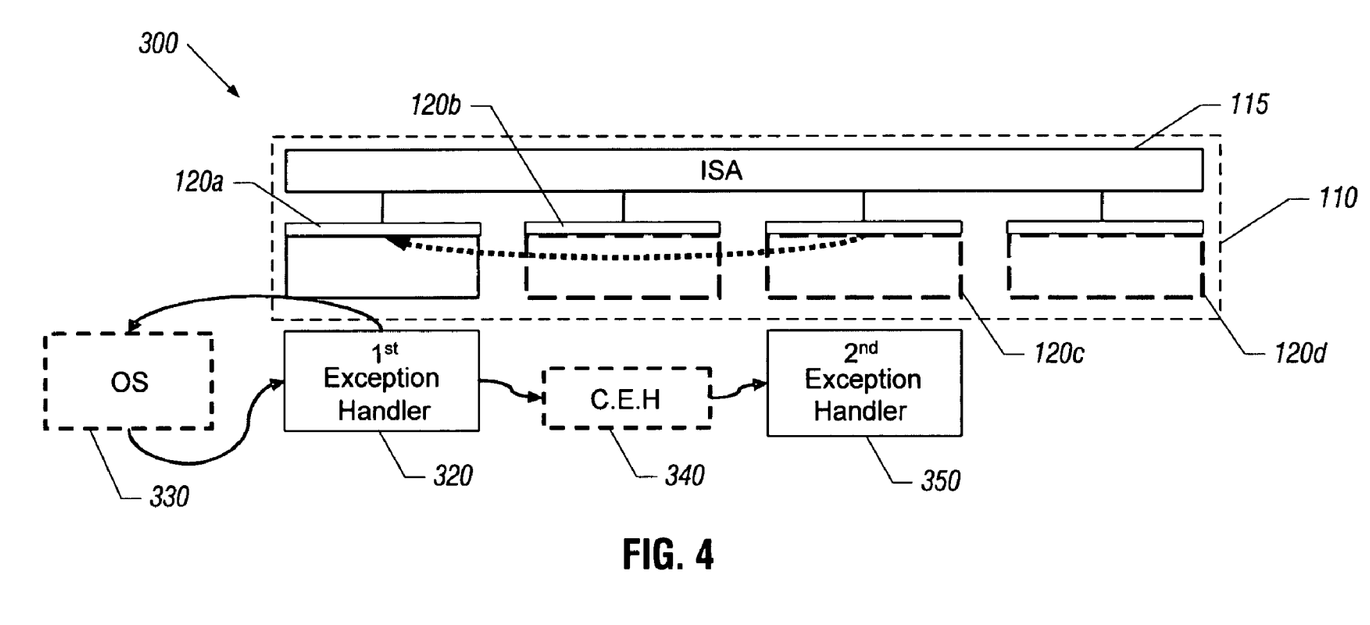
FIG. 4 is a block diagram of a portion of a system in accordance with another embodiment of the present invention.

Referring now to FIG. 4, shown is a block diagram of a portion of a system in accordance with another embodiment of the present invention. As shown in FIG. 4, system 300 includes a processor 110, which may conform to processor 110 of FIG. 2. For ease of illustration, only sequencers 120a-d and ISA 115 are shown in FIG. 4 with respect to processor 110.

To handle exceptions (e.g., FP overflow or underflow) incurred on the exo-sequencer via OMS mechanisms as structural exception handling (SEH) in the OMS code flow, proxy execution may support exceptions incurred on the exo-sequencer via a collaborative exception handler (CEH) mechanism. A CEH may be used in certain situations, as on one hand certain exception handling (e.g., Institute of Electrical and Electronics Engineers (IEEE)-comformant double-precision FP exception handling) requires significant complexity in hardware (as well as software) implementation, and on the other hand, industry-standard microprocessors and traditional OS's have already extensive support for exception handling. For a given exo-sequencer, CEH allows the hardware to be simplified by enlisting the OMS (usually a general-purpose processor such as an IA-32 processor) to use an existing OS mechanism such as structural exception handling to handle the exception on behalf of the exo-sequencer. The exo-sequencer hardware may detect the exception and notify the OMS to request proxy execution.

In various implementations, third sequencer $120_c$ may have different native data types on which operations are performed. Accordingly, if exceptions occur during operations on third sequencer $120_c$, these different native data types would cause different exception handling than the exception handling performed in first sequencer $120_a$. For example, first sequencer $120_a$ and the native OS 330 may support standard floating-point (FP) exception handling as FP is a native data type on first sequencer $120_a$. However, some implementations of third sequencer $120_c$ may support vectors of FPs and thus single instruction multiple data (SIMD) operations are applicable to such composite data types on third sequencer $120_c$. Accordingly, if an exception happens, handling of the exception would implicate a composite native data type that is not understood by first sequencer $120_a$ or the underlying OS.

To effect different exception handling in the sequencers, a first exception handler 320 associated with first sequencer 120$_a$ may have different mechanisms than a second exception handler 350 associated with third sequencer 120$_c$. To minimize support required in third sequencer 120$_c$, exception handling may be off-loaded to first sequencer 120$_a$. Thus third sequencer 120$_c$ will signal first sequencer 120$_a$ and notify it of the exception. In cases where the native data type on which the exception is raised differs from the data type on first sequencer 120$_a$ for which exception can be handled architecturally, transformation may be performed, e.g., by breaking vector FPs into scalar FPs, and mapping the exception conditions on the vector FPs to scalar FP exceptions which can be understood by first sequencer 120$_a$. Then third sequencer 120$_c$ may signal first sequencer 120$_a$ for proxy handling of the request for the exception. In some other embodiments, third sequencer 120$_c$ may suspend execution and rely upon first sequencer 120$_a$ to later request its states (via a state SAVE mechanism) and then use software methods to emulate the third sequencer's exception occurrence. Also, without loss of generality, it may be assumed that first sequencer 120$_a$ is an OMS, though in general, it may be an application-managed sequencer that is capable of handling the exception without incurring OS service (e.g., the fixup of certain exception can be done via application software emulation).

When the proxy execution request signal from third sequencer 120$_c$ is handled at the first sequencer 120$_a$, the handler may access the exception record and ensure the exception is resolved there. The handling of the exception on the OMS may be performed via hardware, firmware, or software running on first sequencer 120$a$ (including, e.g., an OS exception handler and SEH handling software stack).

Due to format differences in native data types between first sequencer 120$a$ and third sequencer 120$c$, the exception fix-up data format on first sequencer 120$a$ may need to be "transformed" or "transcoded" into the format of third sequencer 120$c$. This transformation can be done in hardware, firmware, or software, depending on the data type associated with the exception (single precision, double precision, etc.). When first sequencer 120$a$ completes the proxy execution on fixing up the exception, it signals third sequencer 120$c$ of the completion of proxy execution, and suspended execution resumes on third sequencer 120$_c$. Consequently, third sequencer 120$_c$ will resume execution as if the fix-up is performed locally and proceed to make forward progress.

As shown in FIG. 4, a translation mechanism, referred to as a CEH 340 may provide the requested exception result performed in first exception handler 320 to second exception handler 350 in its native format. As represented by the dashed box in FIG. 4, the functionality of CEH 340 may be implemented as part of first sequencer 120$_a$ or third sequencer 120$_c$, for example. In this way, an exception condition is handled in a mode such that an exception of a heterogeneous resource, e.g., third sequencer 120$_c$ may be gracefully handled by an OS running on an OMS, and the result of proxy execution is provided to third sequencer 120$_c$.

Figure 5:
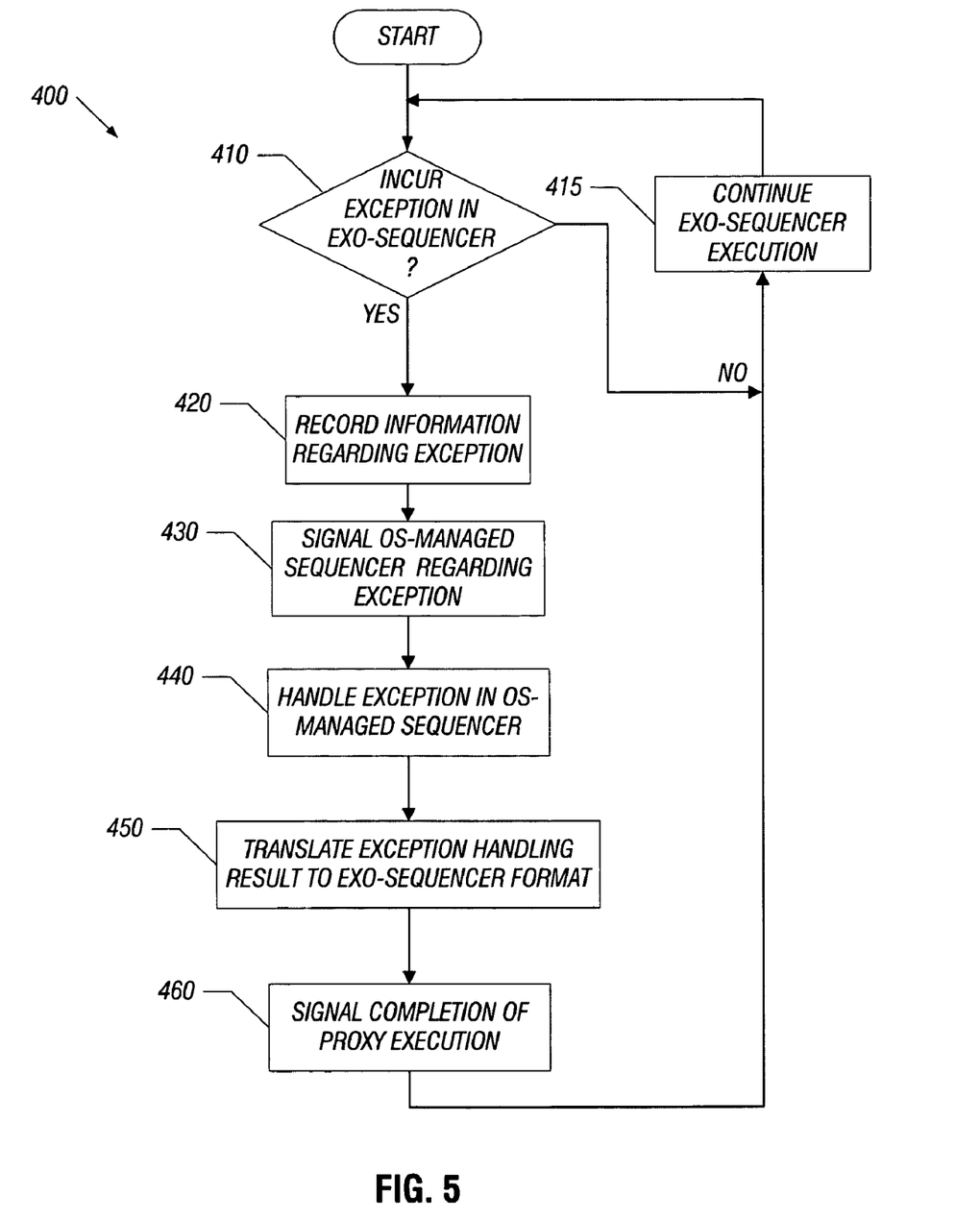
FIG. 5 is a flow diagram of a method of handling an exception in a heterogeneous resource in accordance with one embodiment of the present invention.

In various implementations, different manners of performing exception handling may be realized. Referring now to FIG. 5, shown is a flow diagram of a method of handling an exception condition in a heterogeneous resource in accordance with one embodiment of the present invention. As shown in FIG. 5, method 400 may begin by determining whether an exception occurred in an exo-sequencer (diamond 410). This exception may correspond to numerical exception, e.g., a FP exception. Upon incurring such an exception, the exo-sequencer may suspend its code execution and record information regarding the exception (block 420). More specifically, the exo-sequencer may record the instruction causing the exception condition and an exception record. If no such exception is incurred, control passes to block 415, where continued execution of instructions in the exo-sequencer may occur, with control looping back to diamond 410.

Still referring to FIG. 5, from block 420 control passes to block 430. There, an OMS may be signaled regarding the exception (block 430). More specifically, the exo-sequencer may signal the OMS to notify it regarding the exception. In one embodiment, a proxy execution request signal may be sent. Such a signal may be sent with message information regarding the exception. This information may include an identification of the type of exception and address of the instruction causing the exception. Different manners of passing an exception to the OMS can be effected. For example, in some embodiments the exo-sequencer may send an inter-sequencer communication including identification of an exception along with an instruction pointer (e.g., EIP) to enable the OMS to handle the exception or a pointer-based approach, as discussed above, may also be implemented.

In response to the proxy execution request signal, the OMS may handle the exception (block 440). More specifically, a native exception handling mechanism of the OMS may be activated to perform the handling. The handler may access the exception record and resolve the exception. As an example, the OMS may replay the instruction pointed to by the instruction pointer and emulate the requested operation in software. Such emulation may be built into the native OS in some embodiments. After completion of the proxy exception handling on the OMS, the exception result may be translated to the format of the exo-sequencer (block 450). Accordingly, a collaborative exception handling translation procedure may occur. In various embodiments, this process may be executed by the OMS or the exo-sequencer or an intermediary to transform the result into a format of the exo-sequencer. For example, in one embodiment, the OMS can update a memory image of exo-sequencer after the fixup of the exception handling, and then use a restore instruction to restore the memory image back to the exo-sequencer before resuming its execution.

Still referring to FIG. 5, when the OMS completes proxy execution on handling the exception, it may signal proxy execution completion to the exo-sequencer (block 460). Accordingly, execution may continue on the exo-sequencer (block 415). While described with this particular implementation in the embodiment of FIG. 5, it is to be understood that the scope of the present invention is not limited in this regard. Using method 400 or a similar such method to handle exceptions in an OMS of a system, exceptions on an exo-sequencer can be handled by a general-purpose OMS in a proxy execution mode, despite differences in exception handling mechanisms. Accordingly, there is no need for support in the exo-sequencer for emulating or otherwise performing exception handling.

Thus using embodiments in the present invention, a design in hardware and/or software of an exo-sequencer may be simplified and functionality for handling various exceptions such as architectural floating-point exceptions or exceptions relating to other architectural events can be off-loaded back to an OMS via proxy execution. In this way, the exo-sequencer can be configured and optimized to handle computational processing of particular functions such as graphics processing or other fixed function operations, without increasing the logic or delaying critical paths with support for exception handling. Instead, the exo-sequencer can raise an exception when such an architectural event occurs, and offload the handling to the OMS.

In still other embodiments, support for future enhancements of the hardware of an exo-sequencer may be realized via exception handling in accordance with an embodiment of the present invention. That is, instructions or other programming constructs may be implemented to enable new features in hardware. However, to aid in various development processes such as early software enablement, these instructions or constructs may be defined and available before the hardware has been fully implemented in an exo-sequencer.

Accordingly, to enable execution of these instructions or constructs and to speed development cycles, embodiments may implement exception handling to handle emulation of these operations. When an exo-sequencer is faced with such an instruction or construct, the exo-sequencer may raise an exception that is provided to the OMS via CEH, e.g., via an inter-sequencer communication. The OMS may handle this exception, e.g., by emulating the operation in software on the OMS. Accordingly, development cycles may be improved as numerous patches to enable the emulation of new exo-sequencer capabilities can be implemented without requiring either patching of limited microcode space of an exo-sequencer or multiple hardware revisions, requiring the delays associated with new masks and wafer fabrication.

For example, to enable development an exo-sequencer may provide an instruction decoding mechanism for new instructions. However, all that is needed is for these instructions to be decoded to enable the exo-sequencer to raise an exception, thus allowing the OMS to handle the exception. In this way, software development may proceed before actual full hardware functionality is provided in the exo-sequencer.

By using embodiments of the present invention, a shared virtual memory space may be used by the exo-sequencer and OMS. According, the need for OS-based drivers and the overhead associated therewith can be avoided. Furthermore, the overhead of separate address spaces for an OMS and exo-sequencer can also be eliminated. Accordingly, inefficient direct memory access (DMA) transfers of data between exo-sequencer and OMS via OS mechanisms can be avoided. Instead, data transfers from exo-sequencer to OMS (and vice versa) may be implemented via passing pointers to locations in the shared memory, without the need for actual data transfer, reducing time and compensation expense. As such, inter-sequencer communication and data manipulation therebetween can be performed in an OS-independent manner, reducing complexity and overhead.

Sequencers of different faulting and exception structures can thus be architecturally integrated such that a single image OS can handle a variety of exceptions to support known (e.g., legacy) exception handling models such as SEH, and the like and a virtual shared memory system can be robustly supported. As a result, the exo-sequencer hardware does not need to incorporate or replicate the functionality and complexity of an OMS's ISA to autonomously handle exception and fault conditions. Instead, the exo-sequencer only needs to detect its own fault or exception, and a veneer stub (e.g., an exo-skeleton) or other mechanism may translate the data format and report the exception or fault condition to the OMS, which can perform thorough handling. The result is then translated back to the exo-sequencer's native format (e.g., page table entry format or native composite data format).

Thus, the hardware of an exo-sequencer does not need to replicate the logic and complexity of an OMS's paging mechanism and/or exception handling mechanism. Instead, the exo-sequencer may provide a minimal hook to detect an exception/fault, suspend execution, signal the OMS for proxy execution and receive and translate results back to the exo-sequencer. Such activities may be done at minimal cost and off the critical path. Consequently, from programming model perspective, an exo-sequencer sharing virtual memory with the OMS can be much easier to program since shared memory-based synchronization software paradigms can be applied. Further, applications can directly tap exo-sequencer computation abilities without having to rely upon an OS driver that may incur much higher overhead and defeat the benefits of integration. For example, without shared memory, some of the data computation traffic would have to go off-chip and through, e.g., a front-side bus between OMS and exo-sequencer, and even though OMS and exo-sequencer share a last level cache. In contrast, with a shared memory model enabled by embodiments of the present invention, the shared working set between OMS and exo-sequencer can be resident on the coherent last level cache, and there is no need to go off-chip to communicate. As a result, an application using an OMS and exo-sequencer in the same thread context may benefit from the bandwidth of an on-chip memory hierarchy and achieve performance that a driver-based approach may not attain.

Figure 6:
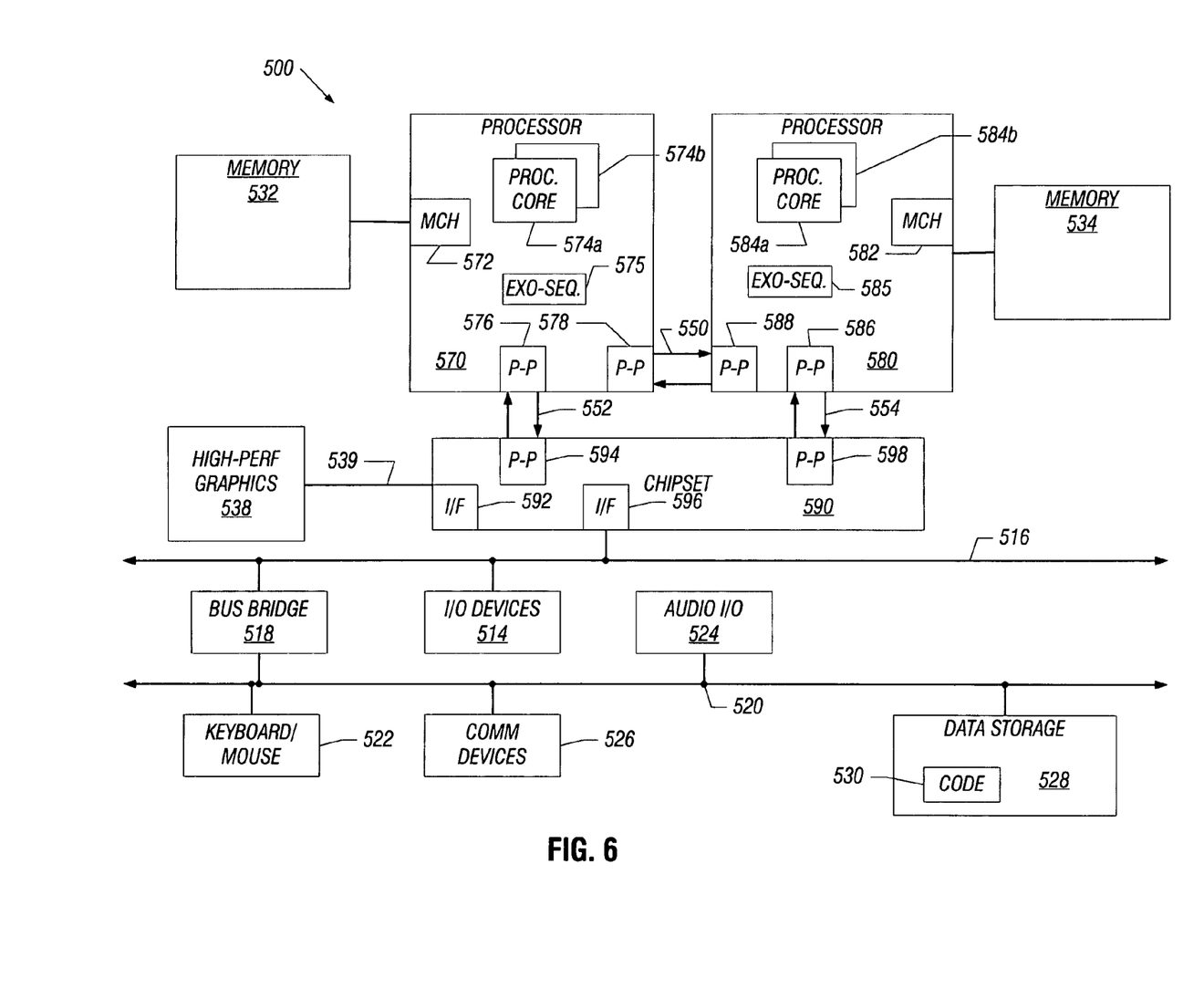
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b). Each of processors 570 and 580 may further include an exo-sequencer, i.e., a first exo-sequencer 575 and a second exo-sequencer 585. As discussed above, exo-sequencers 575 and 585 may be heterogeneous resources with respect to the remaining resources of processor cores 570 and 580. While shown with only a single exo-sequencer per processor, it is to be understood that the scope of the present invention is not so limited, and multiple exo-sequencers may be present in a given processor.

First processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 6, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the *Accelerated Graphics Port Interface Specification, Revision* 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the *PCI Local Bus Specification, Production Version, Revision* 2.1, dated June 1995 or a bus such as a PCI Express bus or another third generation input/output (I/O) interconnect bus, although the scope of the present invention is not so limited.

As shown in FIG. 6, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 6, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    communicating a request for handling of a fault or exception occurring in an accelerator to a first instruction sequencer, wherein the accelerator comprises a heterogeneous resource with respect to the first instruction sequencer; and
    handling the fault or exception in the first instruction sequencer responsive to the request to obtain an address translation according to a memory paging mechanism of the first instruction sequencer and translating the address translation according to a memory paging mechanism of the accelerator.

2. The method of claim 1, wherein communicating the request comprises sending the request via an inter-sequencer protocol and without operating system (OS) support, wherein the accelerator is transparent to the OS.

3. The method of claim 1, further comprising handling the fault or exception via an operating system (OS)-based handler associated with a first instruction set architecture of the first instruction sequencer, wherein the accelerator comprises a resource of a second instruction set architecture.

4. The method of claim 1, further comprising translating a result of the handling to a format of the accelerator.

5. The method of claim 1, further comprising handling the exception via an operating system (OS)-based handler associated with the first instruction sequencer to obtain a result in a form of the first instruction sequencer and translating the result to a form of the accelerator.

6. The method of claim 1, further comprising performing a processing task on the accelerator and storing a result in a shared memory accessible by the first instruction sequencer without operating system involvement.

7. The method of claim 1, further comprising handling the exception in the first instruction sequencer via development patch code, wherein the development patch code is to emulate functionality of hardware for the accelerator under development.

8. An apparatus comprising:
    a first instruction sequencer to perform instructions;
    a second sequencer coupled to the first instruction sequencer including a heterogeneous resource with respect to the first instruction sequencer, wherein the second sequencer is to send a request to the first instruction sequencer to perform proxy execution when the second sequencer incurs an address translation fault; and
    a re-mapper to translate an address translation generated in the first instruction sequencer to an address translation format of the second sequencer.

9. The apparatus of claim 8, wherein the apparatus comprises a processor having a single substrate including the first instruction sequencer and the second sequencer.

10. The apparatus of claim 8, wherein the first instruction sequencer comprises a processing engine of a first instruction set architecture (ISA), and the second sequencer comprises a processing engine of a second ISA.

11. The apparatus of claim 10, wherein the first instruction sequencer includes a first address translation mechanism associated with the first ISA and the second sequencer includes a second address translation mechanism associated with the second ISA.

12. The apparatus of claim 8, wherein the first instruction sequencer is to execute an exception handler responsive to an exception in the second sequencer associated with a non-native data type of the first instruction sequencer.

13. The apparatus of claim 12, wherein the second sequencer includes a transformer to transform the exception of the non-native data type to a native data type of the first instruction sequencer.

14. The apparatus of claim 8, wherein the second sequencer is to send the proxy execution request with aggregated faulting addresses corresponding to a plurality of addresses of a native data type of the second sequencer unavailable in a translation buffer of the second sequencer.

15. The apparatus of claim 8, further comprising a first translation buffer coupled to the first instruction sequencer and a second translation buffer coupled to the second sequencer.

16. The apparatus of claim 15, wherein the first translation buffer is to store an address translation received from a page table responsive to the address translation fault and to provide the address translation to the re-mapper coupled to the first translation buffer and the second translation buffer.

17. The apparatus of claim 16, wherein the re-mapper is to translate the address translation from a format of the first instruction sequencer to a format of the second sequencer.

18. A system comprising:
    a first sequencer to perform instructions of a first operating system, the first sequencer including a first address translation handler and a first exception handler;
    a second sequencer coupled to the first sequencer, the second sequencer including a computation resource that is non-homogeneous with respect to the first sequencer, wherein the second sequencer is to request the first sequencer to handle a translation fault condition or exception condition occurring in the second sequencer;
    a re-mapper to translate an address translation generated in the first sequencer responsive to the translation fault condition to an address translation format of the second sequencer; and a dynamic random access memory (DRAM) coupled to the first sequencer and the second sequencer.

19. The system of claim 18, wherein the first sequencer and the second sequencer comprise heterogeneous resources of a processor.

20. The system of claim 19, wherein the DRAM comprises a shared virtual memory for the first sequencer and the second sequencer, wherein the first sequencer comprises a central processor and the second sequencer comprises a graphics coprocessor.

21. The system of claim 18, wherein the second sequencer is to translate data of a second data type on which the exception condition occurs to a first data type of the first sequencer.

22. The apparatus of claim 8, wherein the first instruction sequencer is to obtain an address translation according to a paging mechanism of the first instruction sequencer and to translate the address translation according to a paging mechanism of the second instruction sequencer.

* * * * *